Jan. 16, 1934.   W. R. HARMAN   1,943,795
MULTIPLE DISK BRAKE
Filed April 21, 1931   3 Sheets-Sheet 1
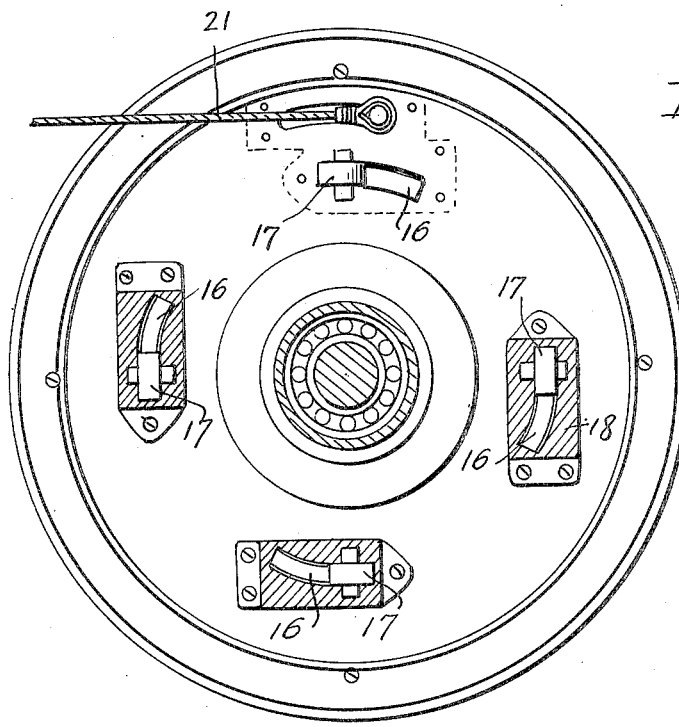
Fig. 1.
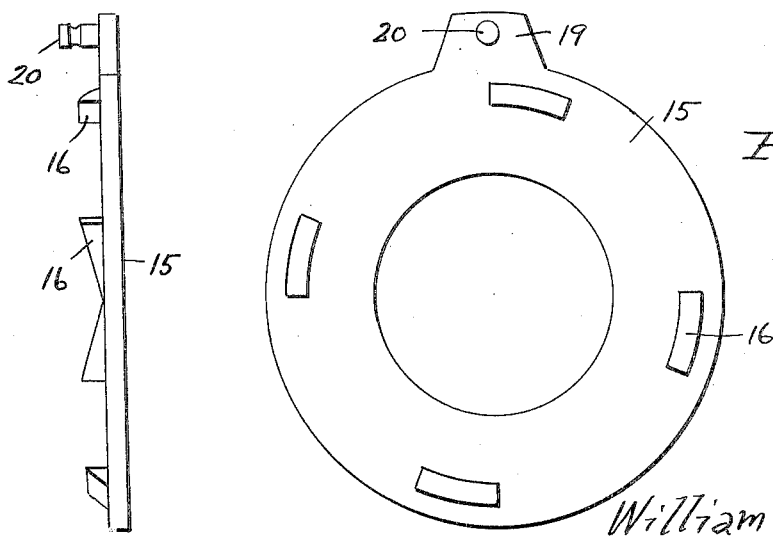
Fig. 6.
Fig. 7.
Inventor
William R. Harman
By Clarence A. O'Brien
Attorney

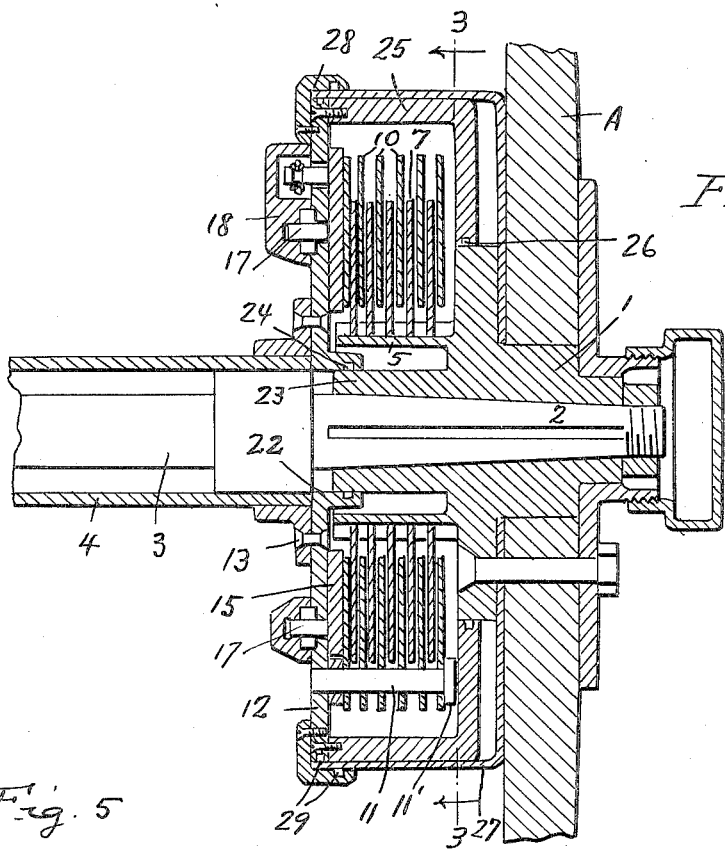
Fig. 2.
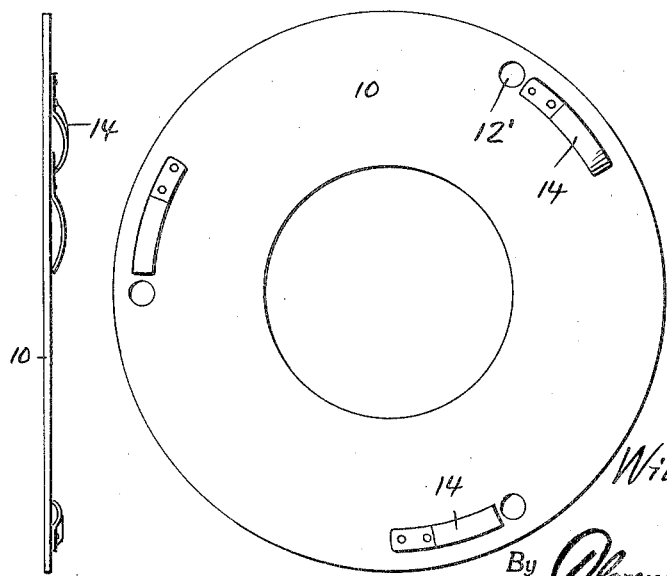
Fig. 5.
Fig. 4.
Inventor
William R. Harman
By Clarence A. O'Brien
Attorney Jan. 16, 1934.   W. R. HARMAN   1,943,795
MULTIPLE DISK BRAKE
Filed April 21, 1931   3 Sheets-Sheet 3

Inventor
William R. Harman
By Clarence A. O'Brien,
Attorney

Patented Jan. 16, 1934

1,943,795

UNITED STATES PATENT OFFICE 1,943,795

MULTIPLE DISK BRAKE

William R. Harman, Macksville, Kans.

Application April 21, 1931. Serial No. 531,820

1 Claim. (Cl. 188—72)

This invention relates to a multiple disk brake for wheeled vehicles such as automobiles, trucks and the like, the general object of the invention being to provide a series of nonrotatable disks connected to a stationary part of the vehicle and a series of rotatable disks connected with the hub of a wheel with means for forcing the disks of the two series together for clamping relation to check or stop the movement of said wheels.

This invention also consists in certain other features of construction and in the combination and arrangement of the several parts, to be hereinafter fully described, illustrated in the accompanying drawings and specifically pointed out in the appended claim.

In describing the invention in detail, reference will be had to the accompanying drawings wherein like characters denote like or corresponding parts throughout the several views, and in which:

Figure 1 is a view looking toward the inner side of the brake mechanism with parts omitted and parts in section.

Figure 2 is a longitudinal sectional view through the brake mechanism and portion of a wheel and its associated parts.

Figure 4 is a face view of one of the nonrotatable disks.

Figure 5 is an edge view thereof.

Figure 6 is a view of the cam plate.

Figure 7 is an edge view thereof.

Figure 3:
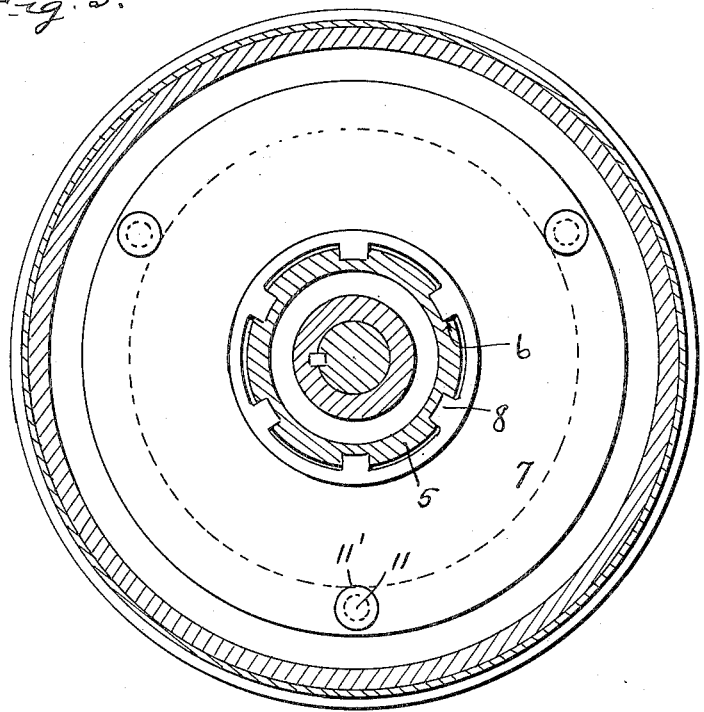
Figure 3 is a section on line 3—3 of Figure 2.
Figure 8:
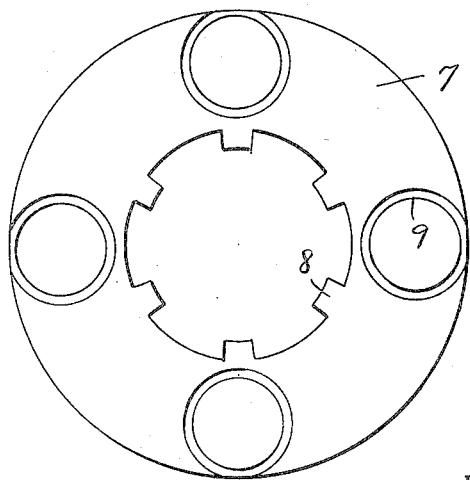
Figure 8 is a face view of one of the rotary disks.

In these drawings, the numeral 1 indicates the hub of a wheel, a portion of which is shown at A and the numeral 2 indicates the spindle to which the hub is connected, the spindle being connected with the usual shaft 3 enclosed in the housing 4. The hub is provided with a tubular part 5 which has the grooves 6 therein and 7 indicates a plurality of disks each having teeth 8 on its inner circumference engaging the grooves 6 so that these disks will rotate with the hub and have sliding movement thereon. Each disk is provided with a plurality of circular grooves 9 which act as oil distributing means as will be hereinafter described. A plurality of ring shaped disks 10 are slidably supported on the studs 11 which pass through holes 12' in the disks 10 and these studs are carried by a circular plate 12 fastened to the housing 4 as shown at 13. These disks 10 overlap the disks 7 with the two sets of disks alternately arranged as shown in Figure 2 and as shown in Figure 2 the periphery of each disk 10 projects a considerable distance beyond the outer periphery of the disks 7. Spring plates 14 are attached to the disks 10 and act to normally hold the disks 10 separated. A cam plate or ring 15 is seated on the plate 12 and has cams 16 thereon which are adapted to be engaged by the rollers 17 journalled in small housings 18 fastened on the exterior face of the plate 12 and extending through slots formed in the plate.

A tongue 19 is formed on one part of the plate 15 and has a pin 20 thereon which projects through a hole in the plate 12 and extends into one of the housings 18 where a cable 21 is connected to the pin and leads to suitable operating means so that when this cable is pulled upon the cam plate 15 is partly rotated so as to bring the cams 16 into contact with the rollers 17 whereby the plate is moved inwardly to press the disks 10 against the disks 7 so that the disks will frictionally engage each other and thus check or stop the rotary movement of the wheel. The last disk of the series 10 rest against the heads 11' of the studs 11 so that this last disk acts as a stop disk for limiting the movement of the disks under the action of the cam plate 15. As soon as the cable 21 is slackened the inclined faces of the cams will ride off the rollers and the springs 14 will press the disks 10 apart and out of frictional engagement with the disks 7 so that the wheel is free to rotate. While the drawings show a cable 21 for rotating the cam plate 15 it will of course be understood that any other suitable means may be used for said purpose.

The plate 12 is provided with an inwardly extending flange 22 for receiving the end of the part 23 of the hub which encircles the spindle and a packing ring 24 is arranged in a groove in the flange 22 to provide an oil tight joint between these parts.

An annular member 25 of angle shape in cross section has one end connected to the periphery of the plate 12 and forms with this plate a casing for enclosing the disks. One part of this annular member 25 abuts a portion of the hub and has a packing ring 26 located in the groove therein to provide an oil tight joint between the hub and the part. A dust ring 27 is attached to an inner part of the hub and extends over the member 25 and rotates in an angle ring 28 which is attached to the plate 12 and overlaps the inner portion of the member 27 and gaskets 29 are placed in grooves in the outer periphery of the plate 12 and contacts the inner portion of the member 27 to make tight joints between these parts.

Thus oil can be placed in the drum casing for lubricating the parts and work between the disks so as to prevent the same from getting hot when held in clamping relation for a long time and this oil also reduces wear to the minimum and insures long life of the working parts.

From the foregoing it will be seen that I have provided a simple type of brake which eliminates lining material and its attending disadvantages and it also prevents dragging brakes and eliminates frequent brake adjustment and the only adjustment necessary is the cable or pull rod. This invention insures a smooth, silent and effective braking action at all times and simply requires an occasional flushing and refilling with new oil of proper weight. As will be seen the brake is housed and sealed in such a way that dust and dirt and other foreign matter cannot enter the working parts and the brake area can be increased one hundred per cent or more without increasing the outside dimension of the brake drum. The grooves 9 act to lift the oil from the casing and distribute it over the disks in the rotary movement of the wheel.

It is thought from the foregoing description that the advantages and novel features of the invention will be readily apparent.

It is to be understood that changes may be made in the construction and in the combination and arrangement of the several parts, provided that such changes fall within the scope of the appended claim.

Having thus described my invention, what I claim as new is:

A disk brake for the wheel of a vehicle and in combination with a shaft housing and the wheel hub, a plate fastened to the housing at the end of the housing and having a centrally located opening therein and an outwardly extending flange thereon surrounding the opening, said flange forming a continuation of the housing and the inner end of the hub fitting in the flange means for forming an oil tight joint between said inner end of the hub and said flange, said hub having a tubular part circumferentially spaced from the inner portion of said hub with the inner end of said tubular part surrounding the flange, a series of ring shaped disks slidably but not rotatably connected to the exterior portion of said tubular part, an annular member of angle shape in cross section connected to the outer portion of the plate and engaging an intermediate portion of the hub and forming with the plate a casing in which the tubular part of the hub and the disks carried thereby are arranged, a second series of disks in the casing and alternating with the first series, a cam plate located in the casing adjacent the first mentioned plate, said first mentioned plate having openings therein, rollers carried by the first mentioned plate and passing through the openings therein and engaging the cams on the cam plate, means for imparting a rotary movement to the cam plate to cause the cams thereon to engage the rollers for moving the cam plate against the inner disk of the second series to cause the disks to engage each other, and small housings on the exterior part of the casing and enclosing the rollers.

WILLIAM R. HARMAN.